May 20, 1958

L. D. STATHAM 2,835,774

ELECTRICAL ACCELEROMETER

Filed May 17, 1954

INVENTOR.
LOUIS D. STATHAM
BY
ATTORNEY.

May 20, 1958  L. D. STATHAM  2,835,774
ELECTRICAL ACCELEROMETER
Filed May 17, 1954  2 Sheets-Sheet 2

INVENTOR.
LOUIS D. STATHAM
BY
ATTORNEY.

United States Patent Office 2,835,774
Patented May 20, 1958

2,835,774

ELECTRICAL ACCELEROMETER

Louis D. Statham, Beverly Hills, Calif., assignor to Statham Instruments, Inc., a corporation of California Application May 17, 1954, Serial No. 430,226

10 Claims. (Cl. 201—63)

This invention relates to accelerometers employing a seismic mass and a mechanical or electro-mechanical transducer as a motion responsive device. This invention relates also to means for extending the range of permissible displacement of the seismic mass without any substantial reduction in the linearity of response of the transducer to the displacement of the said mass.

It is a characteristic of this invention that means are provided to vary the natural frequency of the seismic mass independently of the spring constant of the transducer which is connected to the mass.

As is well known the natural frequency of a spring suspended mass is directly proportional to the square root of its stiffness, i. e., its spring constant, and that also for a given acceleration the frequency for a given stiffness coefficient is inversely proportional to the square root of the displacement of the mass as well as inversely proportional to the square root of the mass.

This invention is particularly useful in connection with the application of electrical resistance strain wire transducers in which the application of a load varies the strain in a fine wire resulting in a change in resistance which is proportional to the strain induced in the wire. Such transducers have been applied to linear accelerometers as is illustrated in the Statham Patent No. 2,573,285, issued October 30, 1951. In such systems the spring constant and permissible magnitude of strain which may be induced in the strain wire determines the natural frequency and the number of wires and their spring constant determine the mass that must be employed to obtain the desired displacement on application of the accelerating force.

Since in such transducers the values of the strain wires employed place a practical limit on the permissible strain which may be developed in the fine wires which are used in such strain wire transducers, the wires must be made either excessively long or one is forced to accept a relatively larger value of the natural frequency.

Modern instrumentation requires that the accelerometers be made very small. Such size limitations impose a restriction on the permissible length of the strain wires and also impose a restriction on the permissible mass of the inertial element, thus resulting in accelerometers having relatively high values of their natural frequency and small permissible displacements of their inertial masses. Another consequence of this design is that in order to reduce the natural frequency and increase the permissible displacement the weight of the inertial mass must be made relatively larger and a sufficient multiplicity of wires must be looped between the mass on the frame on which the mass is suspended in order that the desired displacement be obtained within the limits of the permissible strain on the wire.

It is an object of my invention to design an accelerometer in which an inertial mass is connected to an electrical strain wire transducer and in which the displacement of the mass may be made independent of and different from the variation in extension of the wire resulting from the displacement of the mass.

It is another object of my invention to design an accelerometer having a mass suspended on a yieldable suspension whereby the movement of the mass is sensed by an electrical strain wire transducer, so that a motion of the mass on acceleration causes a variation in extension of the strain wires.

I obtain these results by connecting the inertial mass to the strain wire by means of a flexible connection, e. g., a spring, so that the spring and the wires are in series and the motion of the mass causes a variation in the resilient suspension and this causes a variation in extension of the wires. By adjusting the relative spring constant of the spring and the wires I maintain for any chosen variation of extension of the wires to be obtained upon a chosen acceleration any desired displacement of the mass upon such acceleration. Thus, by making the spring constant of the resilient suspension less than that of the wires, I may cause a displacement of the mass which is greater in magnitude than the simultaneous variation in extension of the strain wires.

By this arrangement I may without changing the magnitude of the inertial mass or the number or length of strain wires employed, obtain a reduction in the natural frequency or in the alternative for like frequencies, reduce the mass which must be employed with the strain wires where the mass is connected directly to the strain wires. The reduction in the mass will thus permit the construction of instruments for the same natural frequency which would be much smaller than those made necessary by the connecting of the mass directly to the strain wires.

By increasing the permissible displacement, a much lower natural frequency can be obtained than would be obtained by connecting the mass directly to the wire, so that the instrument will be insensitive to high frequencies and sensitive to low frequencies, i. e., will filter out high frequencies.

The objects and advantages of the invention will be more readily understood from the following description of a preferred embodiment of my invention taken in connection with the accompanying drawings wherein.

Figure 1:
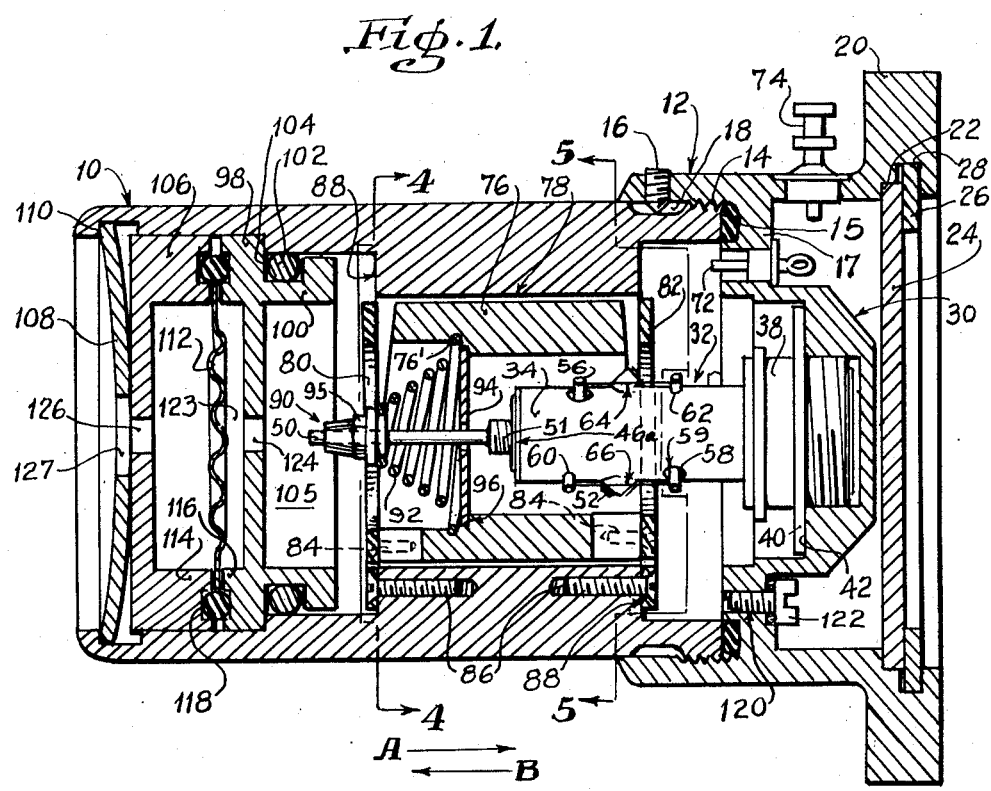
Fig. 1 is a sectional view of my device, shown partly in full for clarity.

The device shown in Fig. 1 has a cylindrical case or body portion 10 and a cylindrical cap portion 12 which is threadably received at 14 on one end of the body member. An O ring 15 is positioned between the threaded end of body portion 10 and an internal flange 17 integral with the cap portion 12, the ring forming a liquid seal between the body and cap portion. An adjustable set screw 16 having a conical point is carried at the end of cap portion 12 adjacent the internal threads thereon, the point of the screw being received within an annular recess 18 in the outer surface of the body member 10 adjacent the externally threaded end thereof to prevent disengagement of the body 10 and cap portion 12.

At the other end of cap portion 12 opposite its internally threaded portion is an external flange 20 having an internal shoulder 22 against which is disposed in abutting relation a cover 24 maintained in position by a snap ring 26 held in an annular groove 28 in the internal surface of the flange 20. Threadably secured at one end within a supporting head 30 which is connected to flange 17, is a sleeve member 32 (see also Fig. 2) having an extended portion 34 of reduced outer diameter, the bore 36 of the sleeve being of uniform diameter throughout the length of such sleeve. The enlarged end portion 38 of the sleeve has a flange 40 thereon which is adapted to abut an internal shoulder 42 on the supporting head 30 and to act as a stop. Sleeve 32 is positioned along the longitudinal axis of the cylindrical case 10.

About the edge of the externally threaded end of sleeve 32 is formed an outwardly extending lip 44 (see Fig. 2) to which is spot welded as at 44' a flexible member or spring 46, the lip 44 affording a clearance space 48 to permit oscillation of the spring 46. Mounted centrally on the flexible diaphragm 46 at 46', as by welding, is a post 49 disposed within the bore 36 of the sleeve and out of contact with the inner surface thereof, the post being threadably engaged at its other end by a threaded connection 51. A second flexible diaphragm 46a is connected as by welding to the other end of post 49 about the connection 51, and to the adjacent end of sleeve 32, in order to maintain post 49 in alignment within the sleeve. Connection 51 is secured to one end of an arm 50 for longitudinal movement thereof with said post on deflection of the diaphragms 46 and 46a. Post 49 and arm 50 have a total mass which is relatively small compared to the inertial mass 76, described hereinafter. Sleeve 32 is provided with angularly disposed adjustable set screws 52 cooperating with grooves 54 in the outer surface of post 49, the ends of the set screws serving to limit the deflection of the diaphragms 46 and 46a and the strain wires described below, by limiting the longitudinal movement of post 49.

Figure 6:
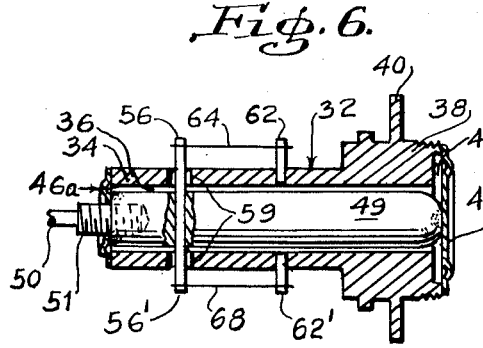
Fig. 6 is a section taken on line 6—6 of Fig. 3.
Figure 7:
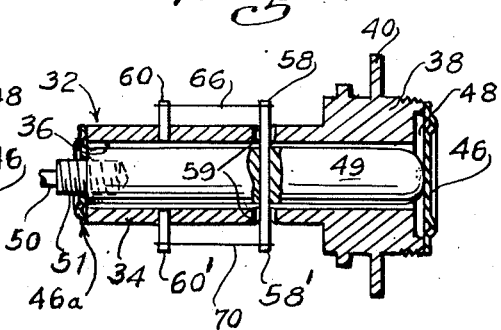
Fig. 7 is a section taken on line 7—7 of Fig. 3.

Referring particularly to Figs. 6 and 7, pins 56 and 56' are positioned diametrically opposite each other on post 49, near one end thereof, and pins 58 and 58' are positioned diametrically opposite each other on post 49 at about the center thereof, the pins 58 and 58' being displaced 90° from the pins 56 and 56'. Pins 56, 56', 58 and 58' extend through slots 59 in sleeve 32, the slots being of sufficient size to permit limited longitudinal displacement of the pins with respect to the sleeve. Connected diametrically opposite each other on the outer surface of the reduced portion 34 of the sleeve 32 near one end thereof, are pins 60 and 60'. Pins 60 and 60' are displaced 90° from pins 56 and 56' and are in longitudinal alignment with pins 58 and 58', respectively, 56, 56', 60 and 60' being in a plane normal to the axis of sleeve 32. Connected diametrically opposite each other on sleeve portion 34 near the other end thereof is another set of pins 62 and 62' which are displaced 90° from pins 58 and 58' and are in longitudinal alignment with pins 56 and 56', respectively, pins 58, 58', 62 and 62' being in a plane normal to the axis of sleeve 32. All of the above pins are insulated.

Electrical resistance strain wires 64, 66, 68, and 70 are respectively looped in tension 56 and 62, and 56' and 62', and 60 and 58, and 60' and 58'. Each of the strain wires is connected by insulated conductors (not shown) to insulated terminals 72 in the flange 17 of cap portion 12, such terminals in turn being connected by insulated conductors (not shown) to four insulated terminals 74 in the side wall of cap portion 12, the latter terminals being connected in a conventional Wheatstone bridge circuit arrangement in a manner well understood in the art, the four strain wires constituting the arms of the bridge.

A hollow cylindrical inertial mass 76 is disposed for longitudinal movement within a bore 78 formed in a portion of body member 10, the mass element 76 being spaced a short distance from the inner surface of the bore 78 and receiving a portion of the previously described sleeve 32 with its pin and wire assembly, and arm 50. The mass 76 is mounted at opposite ends on a pair of flat helical torsion springs 80 and 82, which are preferably identical in structure and spring characteristics, one end of each of these springs being connected to the mass by screws 84, the opposite ends of these springs abutting, and being connected by screws 86, to adjacent shoulders 88 on the interior of body portion 10 at opposite ends of bore 78.

Figure 8:
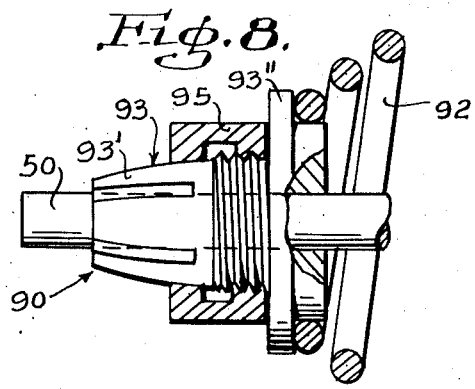
Fig. 8 illustrates a detail of my invention structure.

The free end of arm 50 extends through the center of helical spring 80, and the inwardly extending portion of sleeve 32 and its associated pin and wire assembly passes through the center of helical spring 82. The free end of arm 50 is connected by means of a linkage 90 to the small end of a conical spring 92 surrounding arm 50, the large end of this spring resting in an annular groove 76' about the inner wall of mass 76, and abutting a plate 94, the outer edge of which is urged into contact with an interior shoulder 96 formed along the inner surface of the mass 76. Linkage 90, as shown more clearly in Fig. 8, consists of a collet 93 which is tapered and slotted as at 93' at its outer end and has on its inner end a flange 93" to which is connected the small end of spring 92. The free end of arm 50 passes through collet 93, and a nut 95 having internally tapered threads engages external threads on the collet to hold arm 50 tightly therein. Arm 50, through its threaded connection 51 to post 49, is longitudinally adjustable to vary the compressive force acting on spring 92. Spring 92 is considerably more resilient and yieldable than the strain wires 64, 66, 68 and 70, so that a considerable longitudinal movement of the inertial mass 76 causes a substantially smaller longitudinal movement of arm 50 and post 49 connected to the strain wires.

A member 98 is positioned within body member 10 adjacent the free end of arm 50. Member 98 has an inwardly extending flange 100 which is sealed against the adjacent inner surface of body member 10 by means of an O ring 102 disposed in an annular recess 104 in the outer surface of flange 100. The interior of member 98 forms an expansion chamber 105. An end member 106 is positioned within body member 10 adjacent member 98, end member 106 being secured in position by means of a ring 108 having an arcuate cross section, the outer edge of the ring being disposed against an internal shoulder 110 formed at the inner end of body member 10. A corrugated diaphragm 112 extends across end member 106 normal to the axis of the case or body 10, and is held in place between the end of an inwardly extending flange 114 on end member 106, and a short outwardly extending flange 116 on the intermediate member 98. An O ring 118 is disposed in mating annular recesses in adjacent ends of flanges 114 and 116, and provides a seal therebetween.

All of the inner spaces of the device from the supporting head 30 to the corrugated diaphragm 112 and within the cylindrical longitudinal walls of the body portion 10 and head 30 may be filled with a liquid, the liquid being introduced into these spaces through an aperture 120 in flange 17, the aperture being stoppered by a screw plug 122. The liquid passes from chamber 105 to chamber 123 immediately adjacent diaphragm 112, via an aperture 124 in member 98. An air breather hole 126 is provided in end member 106 and this hole communicates with the central aperture 127 in ring 108.

The liquid employed is of an insulating type. Preferably, I select one having a high density and low viscosity or a high viscosity and low density to give the desired damping effect. While I may choose from a wide variety of liquids, I prefer to employ a liquid having a low viscosity temperature susceptibility and preferably also one having a low value of temperature coefficient of cubical expansion. A particularly useful liquid is the synthetic silicone polymers which have flat viscosity temperature lines on the A. S. T. M. chart.

Figures 2, 3:
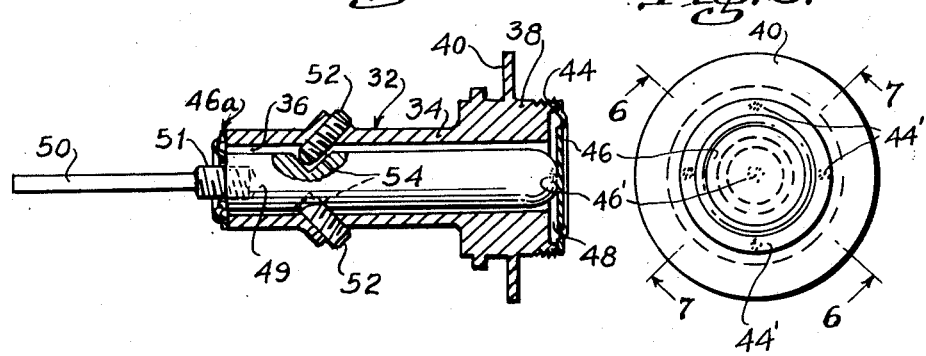
Fig. 2 is a sectional view of a portion of the device of Fig. 1.
Fig. 3 is an end view of the structure shown in Fig. 2.
Figure 4:
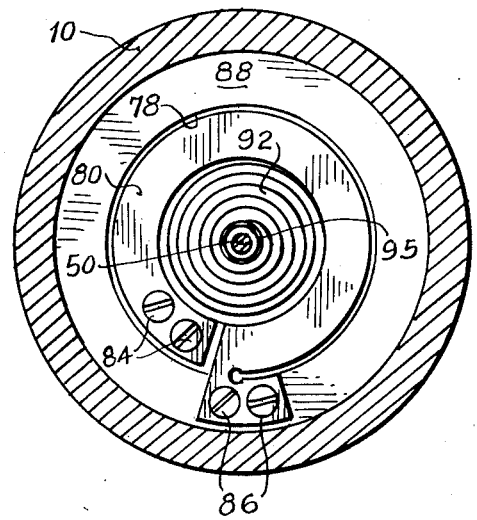
Fig. 4 is a section taken on line 4—4 of Fig. 1, looking in the direction of the arrows.
Figure 5:
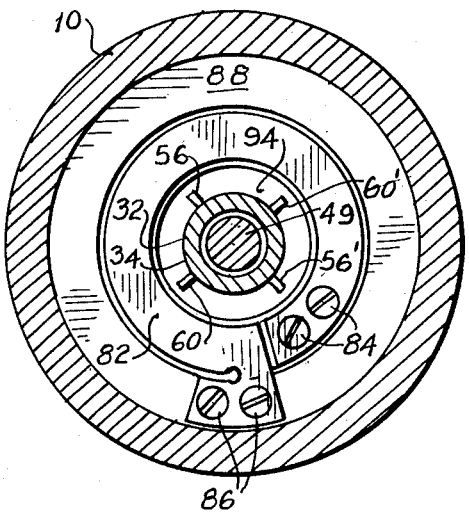
Fig. 5 is a section taken on line 5—5, looking in the direction of the arrows, of Fig. 1.

The device may be assembled as follows:

The unit shown in Fig. 2 including sleeve 32, post 49 and the pin and wire connections is screwed into member 30. As this unit is screwed into member 30, it is locked therein by deflection of flange 40 against the abutting shoulder 42 of supporting head 30. The inertial mass 76 is then mounted in case 10 by means of torsion springs 80 and 82. Plate 94 is then dropped into place and the large end of conical spring 92 is positioned in its receiving groove 76'. Collet 93 is soldered to spring 92, and the unit of Fig. 2 including member 30 and cap portion 12 is threaded onto case 10, with arm 50 guided through the hole in collet 93. The threaded nut 95 is then tightened on the collet to compress the slotted portion thereof and thus grip the arm 50 therein. Finally, members 98 and 106 are inserted in position within the body member 10, the diaphragm 112 being properly located between these members, after which ring 108 is inserted to hold members 98 and 106 in place. The case is then filled with liquid through aperture 120 from the supporting head 30 to the diaphragm 112, as seen in Fig. 1, and cover 24 is secured in position by ring 28.

It will be observed that acceleration of the device in the direction indicated by arrow A in Fig. 1 causes the inertial mass 76 to be displaced to the left against the action of coil springs 80 and 82. This causes arm 50 and post 49 to be displaced to the left also, but by an amount different from, i. e., smaller than, the longitudinal displacement of mass 76, because of the spring connection 92 between the mass and arm 50, the spring 92 being compressed on the above described movement of mass 76. Movement of post 49 to the left causes pins 56 and 56' on the post to move away from stationary pins 62 and 62' on sleeve 32, thus increasing the tension in wires 64 and 68. This same movement of post 49 causes pins 58 and 58' on the post to move toward the stationary pins 60 and 60' on sleeve 32, thus relaxing the tension in wires 66 and 70. The change in resistance of the respective strain wires produces an output from the bridge circuit which is linearly proportional to the amount of displacement of both post 49 and mass 76, and hence proportional to the acceleration producing the displacement of mass 76. Mass 76 will move until the restraining forces of the helical torsion springs 80 and 82, conical spring 92, flexible member 46, and the strain wires are balanced by the force applied to mass 76 as the result of the acceleration.

An acceleration of mass 76 in a direction indicated by arrow B in Fig. 1 urges mass 76, arm 50 and post 49 longitudinally to the right. However, again the amount of displacement of arm 50 and post 49 is less than that of mass 76 because the spring 92 connecting the mass and arm 50 expands on movement of the mass 76 to the right. This action increases the tension in wires 66 and 70, and relaxes the tension in wires 64 and 68 in a manner similar to that previously described, the resulting electrical output from the bridge circuit corresponding to the acceleration of mass 76.

It is seen from the structure of my device as described above that the displacement of mass 76 is made independent of and different from the variation in tension of the strain wires 64, 66, 68 and 70, resulting from the displacement of the mass. By adjusting the spring constant of spring 92, i. e., its stiffness, relative to the strain wires, through adjustment of nut 95, I can maintain for any desired maximum variation of extension of the wires to be obtained upon a maximum chosen acceleration, any desired displacement of the mass. Hence, in accordance with the invention, a displacement of mass 76 can be obtained which is greater in magnitude than the simultaneous variation in extension of the strain wires.

While I have described a particular embodiment of my invention for the purpose of illustration, it should be understood that various modifications and adaptations thereof may be made within the spirit of the invention as set forth in the appended claims.

I claim:

1. A linear accelerometer, which comprises a case, an inertial mass disposed for longitudinal movement in said case, a resilient connection between said mass and the inner wall of said case, a relatively fixed member, a member movable with respect to said first member, an unbonded electrical strain wire, connections between said strain wire and said fixed and movable members, said strain wire being stretched in tension, and a resilient connection between said mass and said movable member.

2. A linear accelerometer, which comprises a case, an inertial mass disposed for longitudinal movement in said case, a resilient connection between said mass and the wall of said case, a relatively fixed member, a member movable with respect to said first member, said movable member having a relatively small mass, a yieldable connection between said fixed member and said movable member, an unbonded electrical strain wire, pin connections between said strain wire and both said fixed and movable members, said strain wire stretched in tension, and a spring connection between said mass and said movable member, the spring constant of said spring connection being less than that of said strain wire.

3. A linear accelerometer, which comprises a case, an inertial mass disposed for longitudinal movement in said case, a torsion spring connection between said mass and the wall of said case, a relatively fixed sleeve, a member received within said sleeve and movable with respect thereto, said movable member having a relatively small mass, an unbonded electrical strain wire, connections between said strain wire and said sleeve and movable member, said strain wire being stretched in tension, an adjustable spring connection between said mass and said movable member, and liquid in said chamber, the spring constant of said spring connection being less than that of said strain wire.

4. A linear accelerometer which comprises a cylindrical case, a hollow inertial mass disposed for longitudinal movement in said case, a helical torsion spring connecting said mass and the wall of said case, a yieldable relatively fixed sleeve, an elongated member received within said sleeve and movable with respect thereto, said movable member having a relatively small mass and being mounted for displacement along the axis of said cylindrical case, a yieldable connection between said sleeve and said movable member, an electrical strain wire, pin connections between said wire and both said sleeve and said movable member, said strain wire being stretched in tension, and an adjustable conical spring connecting said mass and said movable member, the spring constant of said conical spring being less than that of said strain wire.

5. In a transducer, a force summing means, an unbonded strain wire gauge, said strain wire gauge comprising an unbonded electrical resistance strain wire, motion transmitting means for transmitting the motion of said force summing means to one end of said wire to vary the strain in said wire responsive to the motion of said force summing means, said motion transmitting means including a resilient connection to one end of said wire, whereby the motion of said force summing means is transmitted to said resilient connection and to said strain wire, and the strain in said wire is less than the motion of said force summing means, the stiffness of said resilient connection being less than that of said strain wire.

6. A motion sensing device, comprising a chamber, an inertial mass mounted for movement in said chamber, an unbonded electrical strain wire transducer having members displaceable relative to each other supporting a strain wire therebetween to sense the displacement of said mass, and a resilient connection between said mass and said transducer for translating movements of said mass into displacements of said members relative to each other.

7. A linear accelerometer, which comprises a chamber, an inertial mass mounted for longitudinal movement in said chamber, an unbonded electrical strain wire transducer having members displaceable relative to each other supporting a strain wire therebetween to sense the linear displacement of said mass, and a spring connection between said mass and said transducer for translating movements of said mass into displacements of said members relative to each other, the spring constant of said spring connection being less than that of said strain wire transducer.

8. A motion sensing device comprising a movable member, an unbonded electrical resistance strain wire transducer, said transducer including two relatively movable members and means responsive to the motion of said movable member to sense the magnitude of said displacement, means having stiffness to constrain the relative motion of said relatively movable members and a spring connecting said first movable member and said relatively movable members, said spring having a stiffness less than the stiffness of said means for constraining the relative motion of said relatively movable members.

9. A motion sensing device comprising a movable member, an unbonded electrical resistance strain wire transducer, said transducer including two relatively movable members and means responsive to the motion of said movable member to sense the magnitude of such displacement, means having stiffness to constrain the relative motion of said relatively movable members, and a motion transmitting device responsive to the motion of said first movable member and transmitting said motion to said relatively movable members, said motion transmitting device including a spring between said motion transmitting device and said movable members, said spring having a stiffness less than the stiffness of said means for constraining the relative motion of said relatively movable members.

10. A motion sensing device comprising a movable mass, an unbonded electrical resistance strain wire transducer, said transducer including two relatively movable members, and means responsive to the motion of said movable member to sense the magnitude of said displacement, means having stiffness to constrain the relative motion of said relatively movable members, and a motion transmitting device responsive to the motion of said movable mass and transmitting said motion to said relatively movable members, said motion transmitting device including a spring between said motion transmitting device and said movable mass, said spring having a stiffness less than the stiffness of said means for constraining the relative motion of said relatively movable members.

References Cited in the file of this patent

UNITED STATES PATENTS

| | | |
|---|---|---|
| 2,036,458 | Carlson | Apr. 7, 1936 |
| 2,210,970 | Bonell | Aug. 13, 1946 |
| 2,393,714 | Simmons | Jan. 29, 1946 |
| 2,453,601 | Statham et al. | Nov. 9, 1948 |
| 2,487,793 | Esval et al. | Nov. 15, 1949 |
| 2,573,285 | Statham et al. | Oct. 30, 1951 |